US009571813B2

(12) United States Patent
Uchimura

(10) Patent No.: US 9,571,813 B2
(45) Date of Patent: Feb. 14, 2017

(54) PLAYBACK DEVICE, PLAYBACK METHOD, PROGRAM, AND RECORDING MEDIUM

(75) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/643,214

(22) PCT Filed: Oct. 5, 2011

(86) PCT No.: PCT/JP2011/072954
§ 371 (c)(1),
(2), (4) Date: Mar. 1, 2013

(87) PCT Pub. No.: WO2012/050022
PCT Pub. Date: Apr. 19, 2012

(65) Prior Publication Data
US 2013/0195430 A1 Aug. 1, 2013

(30) Foreign Application Priority Data
Oct. 14, 2010 (JP) ................. 2010-231403

(51) Int. Cl.
*H04N 5/93* (2006.01)
*H04N 13/00* (2006.01)
(Continued)

(52) U.S. Cl.
CPC ......... H04N 13/0055 (2013.01); G11B 27/105 (2013.01); H04N 5/85 (2013.01);
(Continued)

(58) Field of Classification Search
CPC .. H04N 13/0055; H04N 5/85; H04N 13/0066; H04N 13/007; H04N 13/026; H04N 9/8205; H04N 9/8211; G11B 27/105; G11B 2220/2541
See application file for complete search history.

(56) References Cited

U.S. PATENT DOCUMENTS

| 2011/0013884 A1 | 1/2011 | Sasaki et al. |
| 2011/0033170 A1 | 2/2011 | Ikeda et al. |
| 2011/0187817 A1* | 8/2011 | Sasaki et al. ............... 348/42 |

FOREIGN PATENT DOCUMENTS

| WO | 2010 095411 | 8/2010 |
| WO | 2010 095443 | 8/2010 |

OTHER PUBLICATIONS

International Search Report Issued Dec. 13, 2011 in PCT/JP11/072954 Filed Oct. 5, 2011.

* cited by examiner

Primary Examiner — Tat Chio
(74) Attorney, Agent, or Firm — Chip Law Group

(57) ABSTRACT

The present invention relates to a playback device, a playback method, a program, and a recording medium that enable 3D playback in accordance with the capabilities of the playback device.
A storage unit 24 stores a one-plane offset capability flag indicating whether or not 3D playback is possible in a one-plane offset mode, which is a mode in which one of two images obtained by shifting an image recorded on a disc 11 in a horizontal direction is output as a left-eye image and the other is output as a right-eye image, and a two-plane capability flag indicating whether or not 3D playback is possible in a two-plane mode, which is a mode in which a left-eye image and a right-eye image that are recorded on the disc are output as they are. A control unit 22 sets a playback mode for 3D playback in accordance with the one-plane offset capability flag and the two-plane capability flag stored in the storage unit 24. The present invention can be applied to, for example, a playback device.

9 Claims, 9 Drawing Sheets

| b31 | b30 | b29 | b28 | b27 | b26 | b25 | b24 |
|---|---|---|---|---|---|---|---|
| Reserved | | | | | | | |
| b23 | b22 | b21 | b20 | b19 | b18 | b17 | b16 |
| Reserved | | | | | | | |
| b15 | b14 | b13 | b12 | b11 | b10 | b9 | b8 |
| Reserved | | | | | | | |
| b7 | b6 | b5 | b4 | b3 | b2 | b1 | b0 |
| | | BD-J Capability during Stereoscopic Output Mode | | | | | |

(51) Int. Cl.
*G11B 27/10* (2006.01)
*H04N 5/85* (2006.01)
*H04N 13/02* (2006.01)
*H04N 9/82* (2006.01)

(52) U.S. Cl.
CPC ....... *H04N 13/007* (2013.01); *H04N 13/0066* (2013.01); *H04N 13/026* (2013.01); *G11B 2220/2541* (2013.01); *H04N 9/8205* (2013.01); *H04N 9/8211* (2013.01)

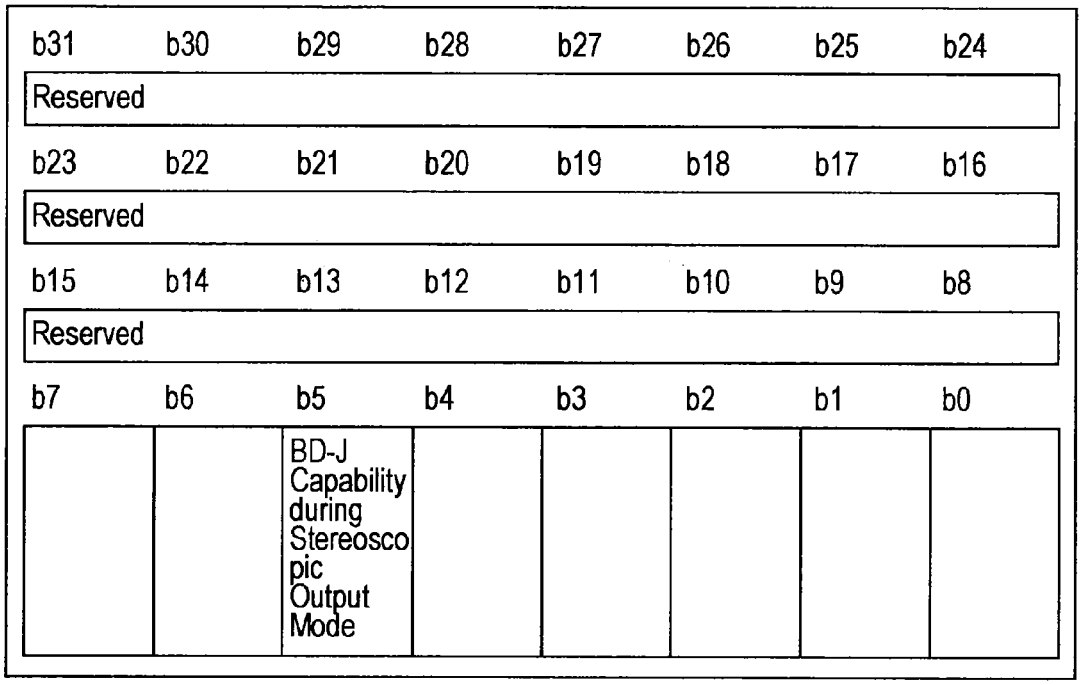

FIG. 4

| PSR24 | | | | | | | |
|---|---|---|---|---|---|---|---|
| b31 | b30 | b29 | b28 | b27 | b26 | b25 | b24 |
| Reserved | | | | | | | |
| b23 | b22 | b21 | b20 | b19 | b18 | b17 | b16 |
| Reserved | | | | | | | |
| b15 | b14 | b13 | b12 | b11 | b10 | b9 | b8 |
| Reserved | | | | | | | |
| b7 | b6 | b5 | b4 | b3 | b2 | b1 | b0 |
| BD-J Capability during 1plane+offset presentation | | BD-J Capability during Stereoscopic Output Mode | | | | | |

FIG. 5

| PSR24 | | | | | | | |
|---|---|---|---|---|---|---|---|
| b31 | b30 | b29 | b28 | b27 | b26 | b25 | b24 |
| Reserved | | | | | | | |
| b23 | b22 | b21 | b20 | b19 | b18 | b17 | b16 |
| Reserved | | | | | | | |
| b15 | b14 | b13 | b12 | b11 | b10 | b9 | b8 |
| Reserved | | | | | | | BD-J Capability during Stereoscopic presentation |
| b7 | b6 | b5 | b4 | b3 | b2 | b1 | b0 |
| BD-J Capability during 1plane+offset presentation | | BD-J Capability during Stereoscopic Output Mode | | | | | |

FIG. 6

| PSR24 | | | | | | | |
|---|---|---|---|---|---|---|---|
| b31 | b30 | b29 | b28 | b27 | b26 | b25 | b24 |
| Reserved | | | | | | | |
| b23 | b22 | b21 | b20 | b19 | b18 | b17 | b16 |
| Reserved | | | | | | | |
| b15 | b14 | b13 | b12 | b11 | b10 | b9 | b8 |
| Reserved | | | | | | | |
| b7 | b6 | b5 | b4 | b3 | b2 | b1 | b0 |
| | | BD-J Capability during Stereoscopic presentation | | | | | |

| PSRXX | | | | | | | |
|---|---|---|---|---|---|---|---|
| b31 | b30 | b29 | b28 | b27 | b26 | b25 | b24 |
| Reserved | | | | | | | |
| b23 | b22 | b21 | b20 | b19 | b18 | b17 | b16 |
| Reserved | | | | | | | |
| b15 | b14 | b13 | b12 | b11 | b10 | b9 | b8 |
| Reserved | | | | | | | |
| b7 | b6 | b5 | b4 | b3 | b2 | b1 | b0 |
| Reserved | | | | | | | BD-J Capability during 1plane+offset presentation |

FIG. 7

|  | 2D PLAYBACK | ONE-PLANE OFFSET 3D PLAYBACK | TWO-PLANE 3D PLAYBACK |
|---|---|---|---|
| VIDEO DATA | ○ | ○ | ○ |
| CAPTION DATA | ○ | ○ | ○ |
| MENU DATA | ○ | ○ | ○ |

FIG. 8

|  | 2D PLAYBACK | ONE-PLANE OFFSET 3D PLAYBACK | TWO-PLANE 3D PLAYBACK |
|---|---|---|---|
| VIDEO DATA | ○ | ○ | ○ |
| CAPTION DATA | ○ | ○ | × |
| MENU DATA | ○ | ○ | × |

FIG. 9

|  | 2D PLAYBACK | ONE-PLANE OFFSET 3D PLAYBACK | TWO-PLANE 3D PLAYBACK |
|---|---|---|---|
| VIDEO DATA | ○ | ○ | ○ |
| CAPTION DATA | ○ | × | ○ |
| MENU DATA | ○ | × | ○ |

| | 2D PLAYBACK | ONE-PLANE OFFSET 3D PLAYBACK | TWO-PLANE 3D PLAYBACK |
|---|---|---|---|
| VIDEO DATA | ○ | × | × |
| CAPTION DATA | ○ | × | × |
| MENU DATA | ○ | × | × |

FIG. 12

```
boolean BDJCapable = false;
try{
BDJCapable =
((RegisterAccess.getInstance().
getPSR(StereoscopicRegisters.PSR_3D_CAPABILITY)
& 0xA0) == 0xA0);
} catch (IllegalArgumentException e){
BDJCapable = false;
}
```

FIG. 13

```
boolean stereoBDJCapable = false;
try{
stereoBDJCapable =
((RegisterAccess.getInstance().
getPSR(StereoscopicRegisters.PSR_3D_CAPABILITY)
& 0x20) == 0x20);
} catch (IllegalArgumentException e){
stereoBDJCapable = false;
}
```

FIG. 14

```
boolean BDJCapable = false;
try{
BDJCapable =
((RegisterAccess.getInstance().
getPSR(StereoscopicRegisters.PSR_3D_CAPABILITY)
& 0x1A0) == 0x1A0);
} catch (IllegalArgumentException e){
BDJCapable = false;
}
```

FIG. 15

```
boolean stereoBDJCapable = false;
try{
stereoBDJCapable =
((RegisterAccess.getInstance().
getPSR(StereoscopicRegisters.PSR_3D_CAPABILITY)
& 0x120) == 0x120);
} catch (IllegalArgumentException e){
stereoBDJCapable = false;
}
```

FIG. 16

```
boolean stereoBDJCapable = false;
try{
stereoBDJCapable =
((RegisterAccess.getInstance().
getPSR(StereoscopicRegisters.PSR_3D_CAPABILITY)
& 0x20) == 0x20);
} catch (IllegalArgumentException e){
stereoBDJCapable = false;
}
boolean oneplaneBDJCapable = false;
```

FIG. 17

```
boolean oneplaneBDJCapable = false;
try{
oneplaneBDJCapability = ((RegisterAccess.getInstance().
getPSR(StereoscopicRegisters.PSR_3D_CAPABILITY)
& 0x80) == 0x80);
} catch (IllegalArgumentException e){
oneplaneBDJCapable = false;
}
```

FIG. 18

```
boolean oneplaneBDJCapable = false;
try{
oneplaneBDJCapability = ((RegisterAccess.getInstance().
getPSR(StereoscopicRegisters.PSR_3D_CAPABILITY)
& 0xA0) == 0xA0);
} catch (IllegalArgumentException e){
oneplaneBDJCapable = false;
}
```

FIG. 19

```
try{
oneplaneBDJCapability = ((RegisterAccess.getInstance().
getPSR(StereoscopicRegisters.PSR_XXXX)
& 0x01) == 0x01);
} catch (IllegalArgumentException e){
oneplaneBDJCapable = false;
}
```

PLAYBACK DEVICE, PLAYBACK METHOD, PROGRAM, AND RECORDING MEDIUM

TECHNICAL FIELD

The present invention relates to playback devices, playback methods, programs, and recording media, and more specifically to a playback device, a playback method, a program, and a recording medium that enable 3D playback in accordance with the capabilities of the playback device.

BACKGROUND ART

A BD (Blu-Ray (registered trademark) Disc) can handle BD-J (BD Java (registered trademark)), and BD-J can provide a high-performance interactive function (see, for example, PTL 1).

In addition, BD players for playing BD-ROMs have PSRs (Player Setting Registers) that store information concerning playback of BD-ROMs.

As illustrated in FIG. 1, a flag called BD-J Capability during Stereoscopic Output Mode (hereinafter referred to as a BD-J capability flag) is stored in b5 of PSR24 among PSRs. The BD-J capability flag is a flag indicating whether or not it is possible to perform 3D playback upon execution of a BD-J object.

In addition, a BD-ROM has recorded thereon a program including the syntax of FIG. 2. The BD player determines, in accordance with the program, whether or not the value of the PSR24 (PSR_3D_CAPABILITY) is "0x20", that is, whether or not the BD-J capability flag is 1. Then, the BD player performs a playback process in accordance with the BD-J capability flag.

Meanwhile, there are two playback modes for 3D playback which are used for BD-ROMs: one-plane offset mode (1 plane+offset presentation type) and two-plane mode (Stereoscopic (two planes) presentation type). The one-plane offset mode is a mode for performing one-plane offset 3D playback in which one of two images obtained by shifting an image recorded on a BD-ROM in a horizontal direction is output as a left-eye image and the other is output as a right-eye image. The two-plane mode is a mode for performing two-plane 3D playback in which a left-eye image and a right-eye image that are recorded on a BD-ROM are output as they are.

CITATION LIST

Patent Literature

PTL 1: International Publication 2005/052940

SUMMARY OF INVENTION

Technical Problem

As above, while there are two playback modes for 3D playback which are used for BD-ROMs, the BD-J capability flag indicates whether or not it is possible to perform 3D playback upon execution of a BD-J object.

Thus, a BD player capable of performing only one of 3D playback in the one-plane offset mode and 3D playback in the two-plane mode upon execution of a BD-J object cannot accurately indicate the 3D playback capabilities of the BD player by using the BD-J capability flag. Consequently, it is difficult to perform 3D playback in accordance with the capabilities of the BD player.

As a result, manufacturers of BD players have been able to manufacture only BD players capable of performing 3D playback in both playback modes, i.e., the one-plane offset mode and the two-plane mode, upon execution of a BD-J object or players not capable of performing 3D playback in either playback mode.

The present invention has been made in view of the above situation, and is intended to enable 3D playback in accordance with the capabilities of a playback device.

Solution to Problem

A playback device in an aspect of the present invention is a playback device including storage means for storing a one-plane offset capability flag and a two-plane capability flag, the one-plane offset capability flag indicating whether or not 3D playback is possible in a one-plane offset mode, which is a mode in which one of two images obtained by shifting an image recorded on a disc in a horizontal direction is output as a left-eye image and the other is output as a right-eye image, the two-plane capability flag indicating whether or not 3D playback is possible in a two-plane mode, which is a mode in which a left-eye image and a right-eye image that are recorded on the disc are output as they are; and setting means for setting a playback mode for 3D playback in accordance with the one-plane offset capability flag and the two-plane capability flag stored in the storage means.

A playback method, a program, and a program recorded on a recording medium in aspects of the present invention correspond to the playback device in the aspect of the present invention.

In an aspect of the present invention, a playback mode for 3D playback is set in accordance with a one-plane offset capability flag and a two-plane capability flag that are stored in storage means, the one-plane offset capability flag indicating whether or not 3D playback is possible in a one-plane offset mode, which is a mode in which one of two images obtained by shifting an image recorded on a disc in a horizontal direction is output as a left-eye image and the other is output as a right-eye image, the two-plane capability flag indicating whether or not 3D playback is possible in a two-plane mode, which is a mode in which a left-eye image and a right-eye image that are recorded on the disc are output as they are.

Advantageous Effects of Invention

According to an aspect of the present invention, 3D playback can be performed in accordance with the capabilities of a playback device.

BRIEF DESCRIPTION OF DRAWINGS

FIG. 1 is a diagram illustrating an example of information stored in conventional PSR24.

FIG. 2 is a diagram illustrating an example of the syntax of a conventional program.

FIG. 4 is a diagram illustrating a first example configuration of information stored in a PSR.

FIG. 5 is a diagram illustrating a second example configuration of information stored in a PSR.

FIG. 6 is a diagram illustrating a third example configuration of information stored in PSRs.

FIG. 7 is a diagram illustrating a first example of the relationships between the capabilities of the playback device and flags.

FIG. 8 is a diagram illustrating a second example of the relationships between the capabilities of the playback device and flags.

FIG. 9 is a diagram illustrating a third example of the relationships between the capabilities of the playback device and flags.

FIG. 12 is a diagram illustrating an example of the syntax in a case where the playback device has the PSR in FIG. 4.

FIG. 13 is another diagram illustrating an example of the syntax in a case where the playback device has the PSR in FIG. 4.

FIG. 14 is a diagram illustrating an example of the syntax in a case where the playback device has the PSR in FIG. 5.

FIG. 15 is another diagram illustrating an example of the syntax in a case where the playback device has the PSR in FIG. 5.

FIG. 16 is a diagram illustrating an example of the syntax in a case where the playback device has the PSRs in FIG. 6.

FIG. 17 is a diagram illustrating another example of the syntax in a case where the playback device has the PSR in FIG. 4.

FIG. 18 is a diagram illustrating another example of the syntax in a case where the playback device has the PSR in FIG. 5.

FIG. 19 is a diagram illustrating another example of the syntax in a case where the playback device has the PSRs in FIG. 6.

DESCRIPTION OF EMBODIMENTS

Embodiment

Example Configuration of Embodiment of Playback Device

Figure 3:
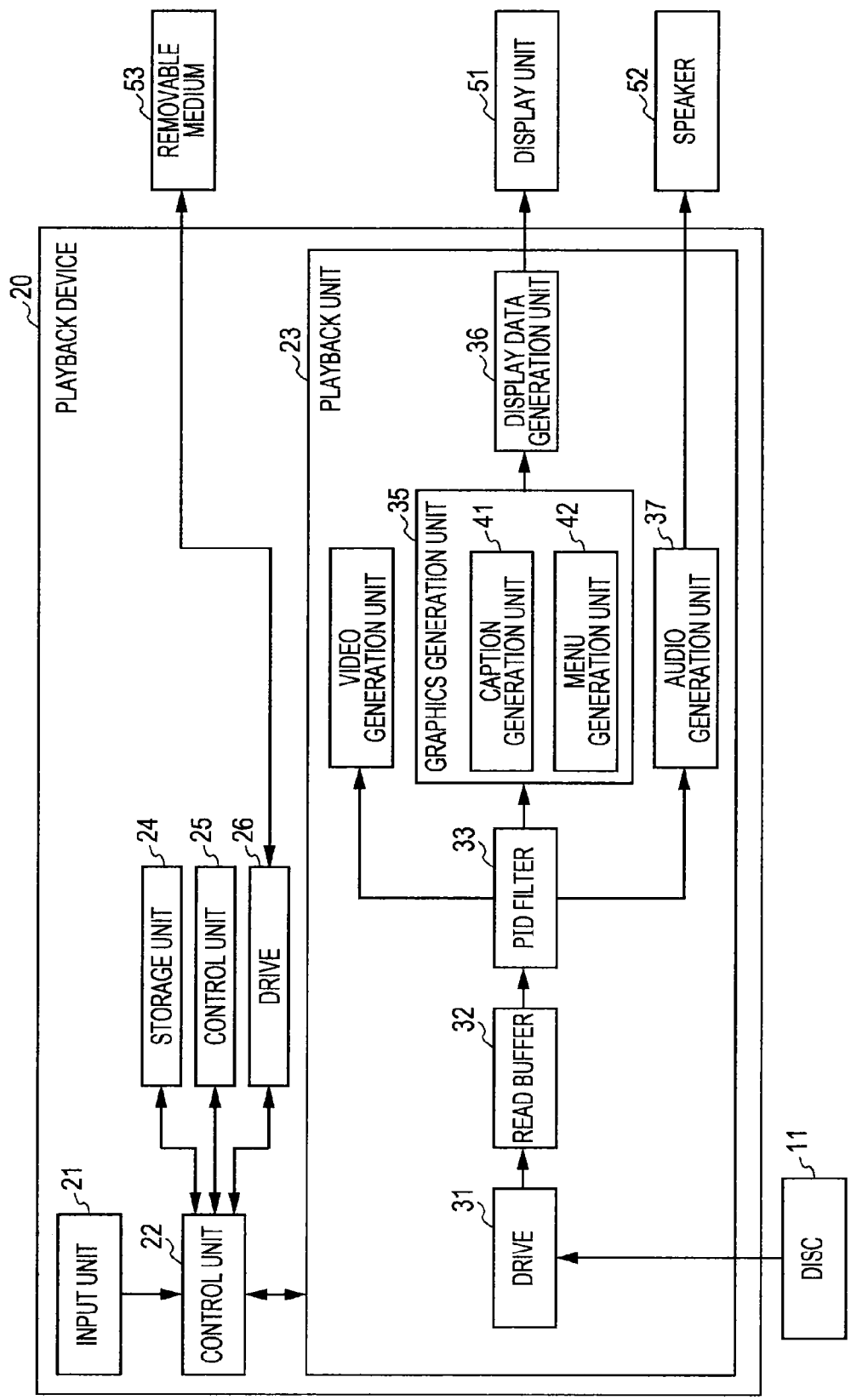
FIG. 3 is a block diagram illustrating an example configuration of an embodiment of a playback device to which the present invention is applied.

FIG. 3 is a block diagram illustrating an example configuration of an embodiment of a playback device to which the present invention is applied.

A playback device 20 in FIG. 3 is constituted by an input unit 21, a control unit 22, a playback unit 23, a storage unit 24, a communication unit 25, and a drive 26. The playback device 20 has a 2D playback function and a 3D playback function in the one-plane offset mode for a disc 11 such as a BD-ROM.

Specifically, the input unit 21 includes a keyboard, a mouse, a microphone, and so forth. The input unit 21 receives an instruction from a user, and supplies the instruction to the control unit 22. The control unit 22 is constituted by a CPU (Central Processing Unit) and so forth. The control unit 22 executes a predetermined program to control the playback unit 23 in accordance with the instruction from the input unit 21. For example, the control unit 22 controls a drive 31 in accordance with an instruction for playing back the disc 11 from the input unit 21, and reads various files recorded on the disc 11. The control unit 22 further controls the playback unit 23 in accordance with navigation commands or applications included in the files read from the disc 11.

The playback unit 23 is constituted by the drive 31, a read buffer 32, a PID filter 33, a video generation unit 34, a graphics generation unit 35, a display data generation unit 36, and an audio generation unit 37.

The drive 31 drives the disc 11 placed therein in accordance with the control of the control unit 22. Accordingly, the drive 31 reads an index file, a movie object file, a BD-J object file, a playlist file, a stream file, and so forth which are recorded on the disc 11.

In the index file, a list of title numbers recorded on the disc 11, and the types and numbers of objects to be executed in association with the title numbers are written. There are two types of objects: movie object and BD-J object. The movie object file is a file of a movie object in which a navigation command is written. The BD-J object file is a file of a BD-J object in which a BD-J application is written.

The playlist file is a file that is read only by the movie object or the BD-J object, and information concerning an AV stream to be played back using these objects is written. The stream file is a file of an AV stream.

It is to be noted that, in this embodiment, an AV stream is encoded in accordance with MPEG2, MPEG-4 AVC (Advanced Video Coding), VC1, or the like, and is constituted by TS (Transport Stream) packets multiplexed in accordance with ISO13818-2 for left-eye video data and right-eye video data for displaying main images of a movie or the like, and the associated audio data, caption data for displaying caption as sub-images, and menu data for displaying menu buttons as sub-images.

The drive 31 supplies the read index file, movie object file, BD-J object file, playlist file, and so forth to the control unit 22. The drive 31 further supplies the AV stream as the read stream files to the read buffer 32.

The read buffer 32 holds the AV stream supplied from the drive 31 or reads an AV stream held therein and supplies the AV stream to the PID filter 33 in accordance with the control of the control unit 22.

In accordance with the packet ID (PID) of the individual packets in the AV stream from the read buffer 32, the PID filter 33 extracts packets of left-eye video data, right-eye video data, caption data, menu data, and audio data, which are included in the AV stream. It is to be noted that the PID is an ID unique to each type of data included in a packet, and is added to the packet.

The PID filter 33 extracts a PES (Packetized Elementary Stream) packet from each of the extracted packets of the left-eye video data, right-eye video data, caption data, menu data, and audio data. Then, the PID filter 33 supplies the PES packets of the video data to the video generation unit 34, and supplies the PES packets of the caption data and menu data to the graphics generation unit 35. The PID filter 33 further supplies the PES packet of the audio data to the audio generation unit 37.

The video generation unit 34 decodes the PES packets of the left-eye video data and the right-eye video data supplied from the PID filter 33, and supplies the resulting left-eye video data and right-eye video data to the display data generation unit 36. It is to be noted that the left-eye video data and the right-eye video data supplied from the PID filter 33 are the same.

The graphics generation unit 35 is constituted by a caption generation unit 41 and a menu generation unit 42. The caption generation unit 41 generates caption data using the PES packet of the caption data supplied from the PID filter 33, and supplies the caption data to the display data generation unit 36.

During execution of the movie object, the menu generation unit 42 generates menu data using the PES packet of the menu data supplied from the PID filter 33. During execution of the BD-J object, on the other hand, the menu generation unit 42 generates menu data in accordance with the control from the control unit 22 while ignoring the PES packet of the menu data. Then, the menu generation unit 42 supplies the generated menu data to the display data generation unit 36.

The display data generation unit 36 generates left-eye display data and right-eye display data from the left-eye video data and right-eye video data supplied from the video generation unit 34 and from the caption data and menu data supplied from the graphics generation unit 35.

Specifically, when 2D playback is to be performed, the display data generation unit 36 combines one of the left-eye video data and right-eye video data supplied from the video generation unit 34, the caption data supplied from the caption generation unit 41, and the menu data supplied from the menu generation unit 42 with one another. Then, the display data generation unit 36 uses the video data obtained as results of combining them as left-eye video data and right-eye video data.

In addition, when 3D playback is to be performed in the one-plane offset mode, the display data generation unit 36 shifts the left-eye video data supplied from the video generation unit 34 in one of the left and right directions by an amount corresponding to a predetermined offset value, and shifts the right-eye video data in the other direction. In addition, the display data generation unit 36 shifts the caption data supplied from the caption generation unit 41 in one of the left and right directions by the amount corresponding to the predetermined offset value to obtain left-eye caption data, and shifts the caption data in the other direction by the amount corresponding to the predetermined offset value to obtain right-eye caption data. The display data generation unit 36 generates left-eye menu data and right-eye menu data from the menu data in a manner similar to generation of the caption data. Then, the display data generation unit 36 combines the generated left-eye video data, caption data, and menu data with one another to generate left-eye display data. The display data generation unit 36 further combines the generated right-eye video data, caption data, and menu data with one another to generate right-eye display data.

The display data generation unit 36 supplies the thus obtained left-eye display data and right-eye display data to a display unit 51 as 3D display data.

The audio generation unit 37 decodes the PES packet of the audio data supplied from the PID filter 33, and supplies the resulting audio data to a speaker 52.

The display unit 51 is constituted by a 3D display and so forth. The display unit 51 performs an output operation based on the 3D display data supplied from the display data generation unit 36. As a result, a user is able to view a 3D image.

The speaker 52 outputs audio corresponding to the audio data supplied from the audio generation unit 37.

The storage unit 24 (storage means) is constituted by a ROM (Read Only Memory), a RAM (Random Access Memory), a hard disk, and so forth, and part of the storage unit 24 forms PSRs. The storage unit 24 stores information concerning playback, a program to be executed by the control unit 22, information generated through the processing performed by the control unit 22, and so forth. The communication unit 25 is constituted by a network card and so forth.

It is to be noted that the program to be executed by the control unit 22 may be stored in the ROM of the storage unit 24, or may be recorded on the hard disk of the storage unit 24 or on a removable medium 53 to be placed in the drive 26, loaded into the RAM of the storage unit 24, and thereby executed.

Examples of the removable medium 53 include a flexible disc, a CD-ROM (Compact Disc Read Only Memory), an MO (Magneto Optical) disc, a DVD (Digital Versatile Disc), a magnetic disc, a semiconductor memory, and so forth.

In addition to being installed into the playback device 20 from the removable medium 53 as described above, the program to be executed by the control unit 22 may also be downloaded into the playback device 20 via a communication network or a broadcast network and installed into the hard disk of the storage unit 24. That is, the program may be wirelessly transferred to the playback device 20 from, for example, a download site via an artificial satellite for digital satellite broadcasting, or may be transferred by wire to the playback device 20 via networks such as a LAN (Local Area Network) and the Internet.

Example Configuration of Information Stored in PSR

FIG. 4 is a diagram illustrating a first example configuration of information stored in PSRs.

In the example in FIG. 4, a flag (hereinafter referred to as the one-plane offset capability flag) indicating whether or not 3D playback in the one-plane offset mode is possible upon execution of a BD-J object, called BD-J Capability during 1 plane+offset presentation, is stored in b7 of PSR24 among PSRs. In addition, in place of a conventional BD-J capability flag, a flag (hereinafter referred to as the two-plane capability flag) indicating whether or not 3D playback in the two-plane mode is possible upon execution of the BD-J object, called BD-J Capability during Stereoscopic presentation, is stored in b5 of the PSR24.

FIG. 5 is a diagram illustrating a second example configuration of information stored in PSRs.

In the example in FIG. 5, the one-plane offset capability flag is stored in b7 of PSR24 among PSRs, and the two-plane capability flag is stored in b8 of the PSR24. It is to be noted that the BD-J capability flag is stored in b5 of the PSR as is conventionally done.

FIG. 6 is a diagram illustrating a third example configuration of information stored in PSRs.

In the example in FIG. 6, similarly to the case of FIG. 4, the two-plane capability flag is stored in place of the conventional BD-J capability flag in b5 of PSR24 among PSRs. In addition, the one-plane offset capability flag is stored in b0 of PSRXX (XX is an arbitrary value other than 24).

As above, in the playback device 20, the one-plane offset capability flag and the two-plane capability flag are stored in a PSR or PSRs. Thus, the playback device 20 is capable of accurately recognizing its 3D playback capabilities.

Specifically, since the playback device 20 has a 2D playback function and a 3D playback function in the one-plane offset mode, the one-plane offset capability flag, which is set to 1, indicating that 3D playback is possible, and the two-plane capability flag, which is set to 0, indicating that 3D playback is not possible, are stored. Therefore, the playback device 20 can recognize that its 3D playback capabilities are the capabilities of performing 3D playback only in the one-plane offset mode, in accordance with the one-plane offset capability flag and the two-plane capability flag.

[Relationships Between Capabilities of Playback Device and Flags]

FIGS. 7 to 10 are diagrams illustrating examples of the relationships between the capabilities of the playback device that plays back the disc 11 and the one-plane offset capability flag and two-plane capability flag.

As illustrated in FIG. 7, a playback device capable of performing 2D playback, one-plane offset 3D playback, and two-plane 3D playback on all video data, caption data, and menu data can perform 2D playback, 3D playback in the one-plane offset mode, and 3D playback in the two-plane mode on the disc 11. Therefore, a PSR of the above playback device stores the one-plane offset capability flag and the two-plane capability flag, which are set to 1, indicating that 3D playback is possible.

In addition, as illustrated in FIG. 8, a playback device, such as the playback device 20 in FIG. 3, capable of performing 2D playback and one-plane offset 3D playback on all video data, caption data, and menu data but not capable of performing two-plane 3D playback on caption data and menu data other than video data can only perform 2D playback and 3D playback in the one-plane offset mode on the disc 11. Therefore, a PSR of the above playback device stores the one-plane offset capability flag, which is set to 1, and the two-plane capability flag, which is set to 0.

Furthermore, as illustrated in FIG. 9, a playback device capable of performing 2D playback and two-plane 3D playback on all video data, caption data, and menu data but not capable of performing one-plane offset 3D playback on caption data and menu data other than video data can only perform 2D playback and 3D playback in the two-plane mode on the disc 11. Therefore, a PSR of the above playback device stores the one-plane offset capability flag, which is set to 0, and the two-plane capability flag, which is set to 1.

Figures 10, 11:
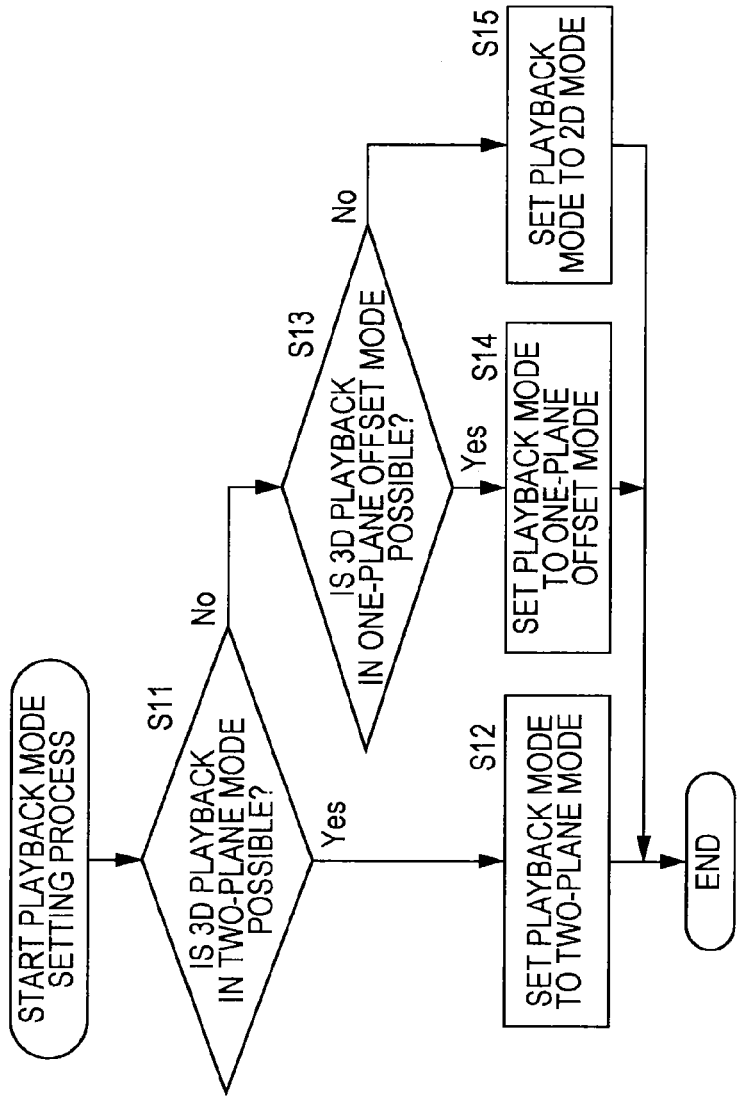
FIG. 10 is a diagram illustrating a fourth example of the relationships between the capabilities of the playback device and flags.
FIG. 11 is a flowchart explaining a 3D playback mode setting process.

In addition, as illustrated in FIG. 10, a playback device capable of performing 2D playback on all video data, caption data, and menu data but not capable of performing one-plane offset 3D playback or two-plane 3D playback on any of video data, caption data, and menu data can only perform 2D playback on the disc 11. Therefore, a PSR of the above playback device stores the one-plane offset capability flag and the two-plane capability flag, which are set to 0.

[Explanation of Process of Playback Device]

FIG. 11 is a flowchart explaining a 3D playback mode setting process performed by the playback device 20 in FIG. 3. This 3D playback mode setting process is performed, for example, when the disc 11 is placed in the drive 31 and the control unit 22 executes the BD-J object to perform 3D playback on the disc 11, by executing the BD-J object or the movie object.

In step S11 in FIG. 11, the control unit 22 determines whether or not 3D playback in the two-plane mode is possible.

Specifically, in a case where the playback device 20 has the PSR illustrated in FIG. 4, the control unit 22 executes, for example, an object describing the syntax in FIG. 12 to determine whether or not the information stored in the PSR24 is "0xA0", that is, whether or not 1 is stored in b7 and b5. Then, if the information stored in the PSR24 is "0xA0", the control unit 22 determines that 3D playback in the two-plane mode is possible. Alternatively, the control unit 22 executes, for example, an object describing the syntax in FIG. 13 to determine whether or not the information stored in the PSR24 is "0x20", that is, whether or not 1 is stored in b5. Then, if the information stored in the PSR24 is "0x20", the control unit 22 determines that 3D playback in the two-plane mode is possible. On the other hand, if the information stored in the PSR24 is not "0xA0" or "0x20", the control unit 22 determines that 3D playback in the two-plane mode is not possible.

In addition, in a case where the playback device 20 has the PSR illustrated in FIG. 5, the control unit 22 executes, for example, an object describing the syntax in FIG. 14 to determine whether or not the information stored in the PSR24 is "0x1A0", that is, whether or not 1 is stored in b8, b7, and b5. Then, if the information stored in the PSR24 is "0x1A0", the control unit 22 determines that 3D playback in the two-plane mode is possible. Alternatively, the control unit 22 executes, for example, an object describing the syntax in FIG. 15 to determine whether or not the information stored in the PSR24 is "0x120", that is, whether or not 1 is stored in b8 and b5. Then, if the information stored in the PSR24 is "0x120", the control unit 22 determines that 3D playback in the two-plane mode is possible. On the other hand, if the information stored in the PSR24 is not "0x1A0" or "0x120", the control unit 22 determines that 3D playback in the two-plane mode is not possible.

Furthermore, in a case where the playback device 20 has the PSRs illustrated in FIG. 6, the control unit 22 executes, for example, an object describing the syntax in FIG. 16 to determine whether or not the information stored in the PSR24 is "0x20", that is, whether or not 1 is stored in b5. Then, if the information stored in the PSR24 is "0x20", the control unit 22 determines that 3D playback in the two-plane mode is possible. On the other hand, if the information stored in the PSR24 is not "0x20", the control unit 22 determines that 3D playback in the two-plane mode is not possible.

If it is determined in step S11 that 3D playback in the two-plane mode is possible, in step S12, the control unit 22 (setting means) sets the playback mode to the two-plane mode, and terminates the process.

On the other hand, if it is determined in step S11 that 3D playback in the two-plane mode is not possible, in step S13, the control unit 22 determines whether or not 3D playback in the one-plane offset mode is possible.

Specifically, in a case where the playback device 20 has the PSR illustrated in FIG. 4, the control unit 22 executes, for example, an object describing the syntax in FIG. 17 to determine whether or not the information stored in the PSR24 is "0x80", that is, whether or not 1 is stored in b7. Then, if the information stored in the PSR24 is "0x80", the control unit 22 determines that 3D playback in the one-plane offset mode is possible. On the other hand, if the information stored in the PSR24 is not "0x80", the control unit 22 determines that 3D playback in the one-plane offset mode is not possible.

In addition, in a case where the playback device 20 has the PSR illustrated in FIG. 5, the control unit 22 executes, for example, an object describing the syntax in FIG. 18 to determine whether or not the information stored in the PSR24 is "0xA0", that is, whether or not 1 is stored in b7 and b5. Then, if the information stored in the PSR24 is "0xA0", the control unit 22 determines that 3D playback in the one-plane offset mode is possible. On the other hand, if the information stored in the PSR24 is not "0xA0", the control unit 22 determines that 3D playback in the one-plane offset mode is not possible.

Furthermore, in a case where the playback device 20 has the PSRs illustrated in FIG. 6, the control unit 22 executes, for example, an object describing the syntax in FIG. 19 to determine whether or not the information stored in the PSRXX is "0x01", that is, whether or not 1 is stored in b0. Then, if the information stored in the PSRXX is "0x01", the control unit 22 determines that 3D playback in the one-plane offset mode is possible. On the other hand, if the information stored in the PSRXX is not "0x01", the control unit 22 determines that 3D playback in the one-plane offset mode is not possible.

If it is determined in step S13 that 3D playback in the one-plane offset mode is possible, in step S14, the control unit 22 sets the playback mode to the one-plane offset mode, and terminates the process.

On the other hand, if it is determined in step S13 that 3D playback in the one-plane offset mode is not possible, in step S15, the control unit 22 sets the playback mode to a 2D mode for performing 2D playback. Then, the process ends.

After the playback mode has been set in the above way, the control unit 22 executes the BD-J objet, thereby controlling the playback unit 23 to perform playback in the set playback mode. Specifically, since the playback device 20 has the one-plane offset capability flag, which is set to "1", and the two-plane capability flag, which is set to "0", the control unit 22 sets the playback mode to the one-plane offset mode, and performs 3D playback in the one-plane offset mode.

As above, the playback device 20 stores the one-plane offset capability flag and the two-plane capability flag in a PSR or PSRs, and sets the playback mode for 3D playback in accordance with the one-plane offset capability flag and the two-plane capability flag. Therefore, the playback device 20 can perform 3D playback in the one-plane offset mode in accordance with the capabilities of the playback device 20.

It is to be noted that while, in this embodiment, a playback device has the 2D playback function and the 3D playback function in the one-plane offset mode, the present invention can also be applied to a playback device having the 2D playback function and the 3D playback function in the two-plane mode and to a playback device having the 2D playback function, the 3D playback function in the one-plane offset mode, and the 3D playback function in the two-plane mode.

And the above playback devices can also perform, similarly to the playback device 20, 3D playback in accordance with the capabilities of the playback devices. As a result, manufacturers of playback devices that play the disc 11 can manufacture playback devices capable of performing 3D playback only in the one-plane offset mode upon execution of the BD-J object and playback devices capable of performing 3D playback only in the two-plane mode.

It is to be noted that, in the foregoing description, an AV stream is constituted by multiplexing encoded left-eye video data and right-eye video data, and the associated audio data, caption data, and menu data. Instead, an AV stream may also be constituted by multiplexing background data that is data of a background image of a main image, in addition to the encoded left-eye video data, right-eye video data, audio data, caption data, and menu data.

In this specification, steps describing a program stored in a program recording medium include not only, of course, processes to be performed in chronological order described above, but also processes not necessarily to be performed in chronological order but to be executed in parallel or individually.

In addition, embodiments of the present invention are not limited to the foregoing embodiment, and a variety of modifications can be made without departing from the scope of the present invention.

REFERENCE SIGNS LIST

20 playback device, 22 control unit, 24 storage unit

The invention claimed is:

1. A playback device comprising:
storage unit for storing a one-plane offset capability flag at a first predetermined location of a Player Setting Register (PSR) and a two-plane capability flag different from the one-plane offset capability flag at a second predetermined location, different from the first predetermined location, of the PSR,
wherein the one-plane offset capability flag indicates whether or not 3D playback of a Blu-Ray disc Java (BD-J) object is possible in a one-plane offset mode by the playback device,
wherein the one-plane offset mode is a mode in which a first image recorded on a disc in the playback device is output as a right-eye image and a second image obtained by shifting the first image in a horizontal direction is output as a left-eye image during the 3D playback of the BD-J object,
wherein the two-plane capability flag indicates whether or not the 3D playback of the BD-J object is possible in a two-plane mode by the playback device,
wherein in the two-plane mode the first image to be used as the right-eye image and a third image to be used as the left-eye image during the 3D playback of the BD-J object are both recorded on the disc; and
a processor configured to:
determine whether the playback device is capable of performing the 3D playback of the BD-J object in the one-plane offset mode or in the two-plane mode for each of video data, caption data and menu data based on a first predetermined value stored at the first predetermined location and a second predetermined value stored at the second predetermined location, wherein the first predetermined value is different from the second predetermined value;
set the stored one-plane offset capability flag to a first value and the stored two-plane capability flag to a second value based on the determined capability of performing the 3D playback of the BD-J object in the one-plane offset mode or in the two-plane mode; and
set a playback mode of the playback device for the 3D playback of the BD-J object in accordance with the set first value and the set second value of the one-plane offset capability flag and the two-plane capability flag such that the playback device performs playback based on capability of the playback device determined from the set first value and the set second value.

2. The playback device according to claim 1, wherein the disc is a BD-ROM (Blu-Ray Disc Read Only Memory), and
the one-plane offset capability flag and the two-plane capability flag are stored in the PSR stored in the storage unit.

3. The playback device according to claim 1, wherein the one-plane offset capability flag indicates whether or not the 3D playback in the one-plane offset mode is possible upon execution of the BD-J object,
the two-plane capability flag indicates whether or not the 3D playback in the two-plane mode is possible upon execution of the BD-J object, and
the processor is configured to set the playback mode for the 3D playback during execution of the BD-J object.

4. The playback device according to claim 1, wherein
in an event the two-plane capability flag indicates that the 3D playback of the BD-J object in the two-plane mode is possible, the processor sets the playback mode for the 3D playback to the two-plane mode, and
in an event the two-plane capability flag indicates that the 3D playback of the BD-J object in the two-plane mode is not possible and in an event the one-plane offset capability flag indicates that 3D playback of the BD-J object in the one-plane offset mode is possible, the processor sets the playback mode for the 3D playback of the BD-J object to the one-plane offset mode.

5. The playback device according to claim 1, wherein the playback device is capable of performing the 3D playback of the BD-J object in the one-plane offset mode in an event the playback device performs the 3D playback of the BD-J object in the one-plane offset mode on each of the video data, the caption data and the menu data.

6. The playback device according to claim 1, wherein the playback device is capable of performing the 3D playback of the BD-J object in the two-plane mode in an event the playback device performs the 3D playback of the BD-J object in the two-plane mode on each of the video data, the caption data and the menu data.

7. The playback device according to claim 1,
wherein the presence of the one-plane offset capability flag at the first predetermined location of the PSR and the two-plane capability flag at the second predetermined location of the PSR causes the playback device to perform the 3D playback even in an event the playback device is not capable of 3D playback in the two-plane mode.

8. A playback method for a playback device comprising:
storing a one-plane offset capability flag at a first predetermined location of a Player Setting Register (PSR) and a two-plane capability flag different from the one-plane offset capability flag at a second predetermined location, different from the first predetermined location, of the PSR,
wherein the one-plane offset capability flag indicates whether or not 3D playback of a Blu-Ray disc Java (BD-J) object is possible in a one-plane offset mode by the playback device,
wherein the one-plane offset mode is a mode in which a first image recorded on a disc in the playback device is output as a right-eye image and a second image obtained by shifting the first image in a horizontal direction is output as a left-eye image during the 3D playback of the BD-J object,
wherein in the two-plane mode the first image to be used as the right-eye image and a third image to be used as the left-eye image during the 3D playback of the BD-J object are both recorded on the disc;
determining whether the playback device is capable of performing the 3D playback of the BD-J object in the one-plane offset mode or in the two-plane mode for each of video data, caption data and menu data based on a first predetermined value stored at the first predetermined location and a second predetermined value stored at the second predetermined location, wherein the first predetermined value is different from the second predetermined value;
setting the stored one-plane offset capability flag to a first value and the stored two-plane capability flag to a second value based on the determined capability of performing the 3D playback of the BD-J object in the one-plane offset mode or in the two-plane mode; and
setting a playback mode of the playback device for the 3D playback of the BD-J object in accordance with the set first value and the set second value of the one-plane offset capability flag and the two-plane capability flag such that the playback device performs playback based on capability of the playback device determined from the set first value and the set second value.

9. A non-transitory computer-readable storage medium having stored thereon, a set of computer-executable instructions for controlling a playback device, by causing the playback device to perform steps comprising:
storing a one-plane offset capability flag at a first predetermined location of a Player Setting Register (PSR) and a two-plane capability flag different from the one-plane offset capability flag at a second predetermined location, different from the first predetermined location, of the PSR,
wherein the one-plane offset capability flag indicates whether or not 3D playback of a Blu-Ray disc Java (BD-J) object is possible in a one-plane offset mode by the playback device,
wherein the one-plane offset mode is a mode in which a first image recorded on a disc in the playback device is output as a right-eye image and a second image obtained by shifting the first image in a horizontal direction is output as a left-eye image during the 3D playback of the BD-J object,
wherein in the two-plane mode the first image to be used as the right-eye image and a third image to be used as the left-eye image during the 3D playback of the BD-J object are both recorded on the disc;
determining whether the playback device is capable of performing the 3D playback of the BD-J object in the one-plane offset mode or in the two-plane mode for each of video data, caption data and menu data based on a first predetermined value stored at the first predetermined location and a second predetermined value stored at the second predetermined location, wherein the first predetermined value is different from the second predetermined value;
setting the stored one-plane offset capability flag to a first value and the stored two-plane capability flag to a second value based on the determined capability of performing the 3D playback of the BD-J object in the one-plane offset mode or in the two-plane mode; and
setting a playback mode of the playback device for the 3D playback of the BD-J object in accordance with the set first value and the set second value of the one-plane offset capability flag and the two-plane capability flag such that the playback device performs playback based on capability of the playback device determined from the set first value and the set second value.

* * * * *